United States Patent [19]

Mishima et al.

[11] Patent Number: 5,187,770
[45] Date of Patent: Feb. 16, 1993

[54] PHOTOSETTING RESIN COMPOSITION AND PLASTIC CLAD OPTICAL FIBER COMPRISING THE SAME

[75] Inventors: Takayuki Mishima; Yasuhiro Okuda; Hiroaki Nishimoto, all of Osaka, Japan

[73] Assignee: Sumitomo Electric Industries, Ltd., Osaka, Japan

[21] Appl. No.: 721,554

[22] PCT Filed: Nov. 21, 1989

[86] PCT No.: PCT/JP89/01182

§ 371 Date: Jul. 17, 1991

§ 102(e) Date: Jul. 17, 1991

[87] PCT Pub. No.: WO91/07441

PCT Pub. Date: May 30, 1991

[51] Int. Cl.$^5$ .............. G02B 6/00; G03G 15/00; B05D 5/06
[52] U.S. Cl. .................. 385/145; 385/123; 385/144; 385/141; 430/56; 427/163; 427/407.1
[58] Field of Search ............ 385/126, 123, 127, 128, 385/141, 142, 144, 145; 430/56, 74, 80; 427/162, 163, 164, 165, 407.1, 407.2

[56] References Cited

U.S. PATENT DOCUMENTS

| | | | |
|---|---|---|---|
| 4,099,837 | 7/1978 | Vazirani | 385/141 |
| 4,356,296 | 10/1982 | Griffith et al. | 526/242 |
| 4,452,998 | 6/1984 | Griffith et al. | 560/221 |
| 4,690,502 | 9/1987 | Zimmerman et al. | 385/141 |
| 4,707,076 | 11/1987 | Skutnik et al. | 385/145 |
| 4,733,942 | 3/1988 | Hida et al. | 385/141 |
| 4,738,509 | 4/1988 | Broer et al. | 385/128 |
| 4,783,544 | 11/1988 | Yokoshima et al. | 385/141 |
| 4,787,709 | 11/1988 | Kawada et al. | 385/145 |
| 4,854,666 | 8/1989 | Kohara et al. | 385/145 |
| 5,111,526 | 5/1992 | Yamamoto et al. | 385/145 |
| 5,117,480 | 5/1992 | Yamamoto et al. | 385/145 |
| 5,136,679 | 8/1992 | Broer et al. | 385/145 |

FOREIGN PATENT DOCUMENTS

| | | | |
|---|---|---|---|
| 60-42711 | 3/1985 | Japan | 385/141 X |
| 60-195115 | 3/1985 | Japan | 385/141 X |
| 60-90304 | 5/1985 | Japan | 385/141 X |
| 60-194413 | 10/1985 | Japan | 385/141 X |
| 61-14606 | 1/1986 | Japan | 385/141 X |
| 61-123803 | 6/1986 | Japan | 385/141 X |
| 62-230866 | 10/1987 | Japan | 385/141 X |
| 63-22872 | 1/1988 | Japan | 385/141 X |

*Primary Examiner*—Brian Healy
*Attorney, Agent, or Firm*—Wegner, Cantor, Mueller & Player

[57] ABSTRACT

An optical fiber which has a cladding made of a cured material of a photosetting resin composition comprising at least one compound which has at least two unsaturated bonds in a molecule and a photopolymerization initiator, no compound which has only one unsaturated bond in a molecule being present in the composition, has excellent mechanical properties.

4 Claims, No Drawings

PHOTOSETTING RESIN COMPOSITION AND PLASTIC CLAD OPTICAL FIBER COMPRISING THE SAME

FIELD OF THE INVENTION

The present invention relates to a photosetting resin composition and a plastic clad optical fiber having a cladding made of a cured material of said composition.

RELATED ART

Hitherto, a silicone resin (Japanese Patent Kokai Publication No. 30703/1983), a polyfluoroalkyl methacrylate copolymer (Japanese Patent Kokai Publication No. 66706/1986) and a vinylidene fluoride/tetrafluoroethylene copolymer (Japanese Patent Publication (Kokoku) No. 41966/1981) are known as cladding materials of a plastic clad optical fiber. However, these cladding materials cannot satisfy recent high requirements such as decrease of a transmission loss of the optical fiber and an easy connection of a connector by a crimp procedure. For example, when the silicone resin is used, the optical fiber cannot terminated with the crimp type connector since the mechanical strength is insufficient. When the vinylidene fluoride/tetrafluoroethylene copolymer is used, the optical fiber cannot have a low loss since the copolymer has poor transparency. When the polyfluoroalkyl methacrylate copolymer is used, the strength between the fiber and the crimp type connector is significantly deteriorated at a high temperature since the copolymer has a low softening point but has good transparency.

Recently, a cladding made of an ultraviolet light curing resin composition is proposed as described in Japanese Patent Kokai Publication No. 250047/1987 and U.S. Pat. No. 4,707,076. Since such resin composition can have advantageously has high mechanical strength and an increased production rate of the optical fiber although the prior art optical fibers do not have these advantages.

However, since the resin compositions described in these prior art literatures contain a compound which has only one unsaturated bond in a molecule (such as monofunctional acrylate), the cured material has an insufficient crosslinking density. Thus, hardness and heat resistance (a softening temperature) are not sufficiently high in practice, and the optical fiber has significantly deteriorated mechanical properties at a high temperature. In addition, the resin composition swells and significantly softens by moisture at high humidity. In particular, the retention strength between the optical fiber and the crimp type connector is significantly deteriorated at a high temperature or at a high temperature and a high humidity. Further, the optical fiber has a disadvantage that the core largely protrudes from a tip end of the connector after leaving the optical fiber at a high temperature or at a high temperature and a high humidity or after subjecting the optical fiber to a heat cycle.

These disadvantages seem to be caused by a low softening point since the composition contains the monofunctional unsaturated compound and has the low crosslinking density.

SUMMARY OF THE INVENTION

An object of the present invention is to provide a plastic clad optical fiber having good mechanical strength and mechanical properties, particularly retention strength between a crimp type connector and the optical fiber, which are not deteriorated at a high temperature.

The present invention is intended to increase a crosslinking density of a resin composition so as to improve the mechanical strength and softening temperature and so as to suppress the swell by moisture at a high humidity.

Accordingly, the present invention provides a photosetting resin composition comprising at least one compound which has at least two unsaturated bonds in a molecule and a photopolymerization initiator, no compound which has only one unsaturated bond in a molecule being present in the composition.

The photosetting composition according to the present invention gives a cured material having higher hardness at a normal temperature and a higher softening temperature than the conventional compositions which contain the monofunctional unsaturated compound. Thus, an optical fiber having a cladding made of a cured material of the composition of the present invention suffers from less deterioration of the retention strength between the fiber and the crimp type connector at a high temperature (at least 85° C.) than the conventional optical fibers. In addition, the core protrusion from a tip end of the connector is small after leaving the fiber at a high temperature or at a high temperature and a high humidity or after subjecting the fiber to a heat cycle.

The term "unsaturated bond" is used to mean a carbon-carbon double bond and includes an acryl group and a methacryl group which have good reactivity in addition to a vinyl group and an allyl group.

A refractive index of the cured material of the composition should be smaller than that of a core so that the cured material of the composition functions as the cladding. To this end, the compound contained in the composition according to the present invention may have a fluorine atom.

The composition according to the present invention preferably has a viscosity of 100 to 10,000 cps so that the composition having a thin thickness of 1 to 100 μm is homogeneously coated on the glass core. Accordingly, the composition according to the present invention preferably contains a prepolymerized polymer which has a suitable polymerization degree in addition to a monomer. Such polymer is not limited, provided that it can be crosslinked by UV light irradiation.

Typical examples of the polymer is a copolymer which comprises a repeating unit of the formula:

wherein
$R^1$ is a hydrogen atom or a methyl group, and
$R_f$ is a fluoroalkyl group,
and a repeating unit having an unsaturated bond. The polymer includes, for example, a (meth)acrylate copolymer having an unsaturated bond in an ester side chain and a number average molecular weight of 50,000 to 5,000,000 (as converted to polystyrene) of the formula:

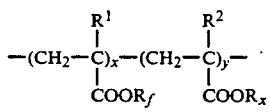

wherein $R^1$ and $R^2$ are each a hydrogen atom or a methyl group, $R_f$ is a fluoroalkyl group, and $R_x$ is a hydrocarbon group having an unsaturated bond.

The $R_x$ group includes a vinyl group, an allyl group, an acryl group, a methacryl group and an internal olefin.

The $R_f$ group includes

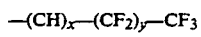

wherein x is 1 or 2 and y is from 2 to 6.

A third component may be copolymerized in such copolymer so as to improve the thermal resistance. Specific examples of the third component are isobornyl (meth)acrylate, dicyclopentanyl (meth)acrylate and adamantyl (meth)acrylate.

Other polymer which can be contained in the composition includes polyurethane (meth)acrylate. Such polyurethane (meth)acrylate may contain either or both of a polyester and a polyether in a molecule. The composition may contain a polycarbonate. Such polymer may contain a fluorine atom so that the cured material of the composition has a suitable refractive index.

The compound having at least two unsaturated bonds in a molecule is preferably a compound having at least two (meth)acryloyl groups and includes the following compounds:

1,4-Butanediol di(meth)acrylate, ethylene glycol di(meth)acrylate, glycerol dimethacrylate, tetraethylene glycol di(meth)acrylate, diethylene glycol (meth)acrylate, 1,3-butylene glycol di(meth)acrylate, neopentyl glycol di(meth)acrylate, triethylene glycol di(meth)acrylate, triglycerol diacrylate, 1,6-hexanediol di(meth)acrylate, tripropylene glycol diacrylate, trimethylolpropane tri(meth)acrylate, pentaerythritol triacrylate, pentaerythritol tetra(meth)acrylate, ditrimethylolpropane tetracrylate, dipentaerythritol hexacrylate, KAYARAD (trade name) MANDA manufactured by Nihon Kayaku Kabushiki Kaisha, and KAYARAD R-604.

The compound having at least two unsaturated bonds in a molecule and further having a fluorine atom includes a compound of the formula:

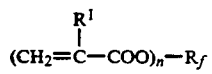

wherein $R^1$ and $R_f$ are the same as defined above, and n is a number of at least two, preferably 2 to 5. It is preferably a compound of the formula:

wherein $R^1$ and $R^2$ are the same as defined above, x is 1 or 2, and y is an integer of 2 to 6.

Values of x and y are selected dependent on necessary properties such as a refractive index, toughness and a viscosity of the composition.

The compound having at least two unsaturated bonds in a molecule may have at least one urethane linkage in a molecule. Such compound includes urethane di(meth)acrylate.

Types and a composition ratio of these compounds which form the composition may be selected to give necessary properties of the cured material. The composition preferably has a viscosity of 100 to 10,000 cps before curing. The cured material of the composition preferably has a breaking strength of at least 1.0 kg/mm$^2$, modulus of at least 10 kg/mm$^2$, an elongation at break of at least 10 %, a refractive index of at most 1.44 and a transmittance (thickness: 0.1 mm) of at least 90 % at a wavelength of 850 nm.

The photopolymerization initiator is preferably a compound which easily generates a free radical through UV light irradiation. An amount of the initiator is preferably from 0.01 to 10 % by weight. The compound which generates the free radical includes the following compounds:

Benzophenone, acetophenone, benzil, benzoin, benzoin methyl ether, benzoin isobutyl ether, benzyl dimethyl ketal, α,α'-azobisisobutyronitrile, benzoylperoxide, 1-hydroxycyclohexyl phenyl xetone, 2,2-dimethoxy-2-phenylacetophenone, 2-hydroxy-2-methyl-1-phenylpropan-1-one. In particular, when used as the cladding of the UV light guiding optical fiber, 1-hydroxycyclohexyl phenyl ketone and 2-hydroxy-2-methyl-1-phenylpropan-1-one are preferable.

The composition according to the present invention may contain a coupling agent for improving the adhesion between the cladding and the glass core. Preferably the coupling agent are colorless, transparent and highly compatible with the compounds contained in the composition according to the present invention. It preferably has substantially the same refractive index as the other components contained in the composition. When the coupling agent is added, the fiber strength can be improved, the fiber can have the improved retention strength between the crimp type connector and the fiber at a high temperature or at a high temperature and a high humidity, and the core protrusion from the tip end of the connector can be decreased after leaving the fiber at a high temperature or at a high temperature and a high humidity or after subjecting the fiber to a heat cycle.

Preferable coupling agents include a monomer such as diethoxydivinylsilane and dimethoxydivinylsilane; and a copolymer of such monomer and (meth)acrylate having an unsaturated bond in an ester side chain of the formula:

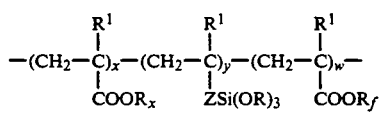

wherein $R^1$, $R_x$ and $R_f$ are the same as defined above,

R is a hydrogen atom, a methyl group, an ethyl group or a propyl group, and

Z is a single bond or an organic group consisting of carbon, hydrogen and oxygen atoms.

Specific examples of the Z group consisting of carbon, hydrogen and oxygen atoms are groups of the formulas:

$-(CH_2)_n-$, $-(CH_2)_n-(CF_2)_m-$ and $-COO-(CH_2)_n-$ wherein m and n are each an integer of 1 to 10.

When the composition according to the present invention is used as the cladding of the plastic clad optical fiber, the composition may be coated on the quartz glass or optical glass by a die coating or spray coating method and then cured by irradiating it with active light such as UV light. An irradiation amount is selected dependent on types and amounts of the compounds contained in the composition.

PREFERRED EMBODIMENT OF THE INVENTION

The present invention will be illustrated by the following Examples and Comparative Examples.

EXAMPLE 1 TO 4

The following polymers (I) to (IV) were used as a polymer having at least two unsaturated bonds in a molecule. Compositions for the cladding material were prepared by mixing these polymers with the compounds indicated in Table 1 in indicated proportions. An amount in Table 1 is in part by weight.

Immediately after drawing a quartz rod into a fiber having an outer diameter of 200 μm, the composition was coated on the fiber and then cured with UV light in a nitrogen atmosphere to obtain an optical fiber having an outer diameter of 230 μm. An ethylene/tetrafluoroethylene copolymer having an outer diameter of 500 μm was extrusion coated on the optical fiber, and then KEVLAR ® was longitudinally lapped on the fiber. Then, polyvinyl chloride having an outer diameter of 2.2 mm was loosely extrusion coated on the fiber to obtain an optical fiber cord.

Table 3 shows the properties when a crimp type optical connector is connected with the optical fiber and the optical fiber cord.

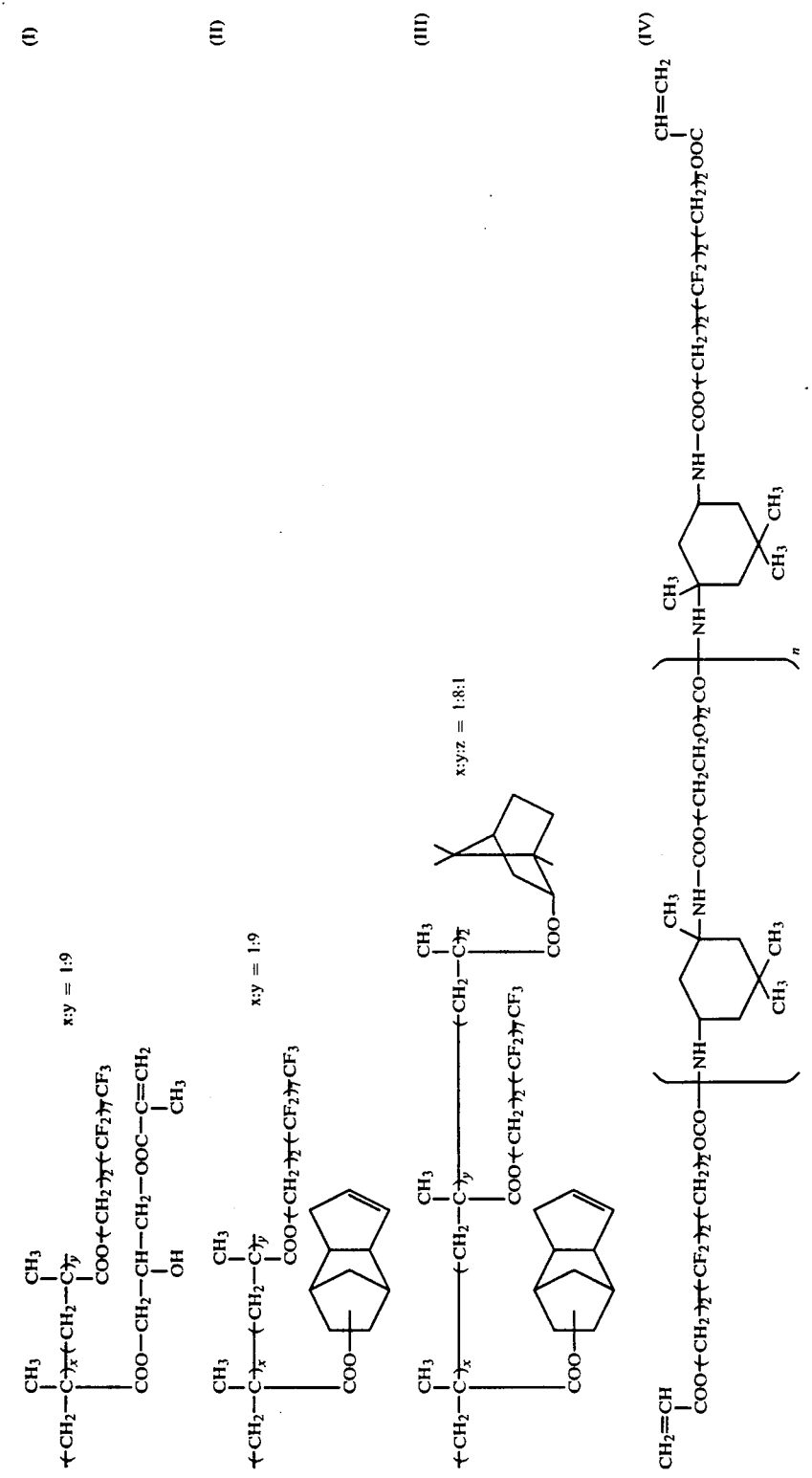

TABLE 1

|  | 1 | 2 | 3 | 4 |
|---|---|---|---|---|
| Polymer (I) | 10 | — | — | — |
| Polymer (II) | — | 10 | — | — |
| Polymer (III) | — | — | 10 | — |
| Polymer (IV) | — | — | — | 10 |
| $CH_2=CHCOOCH_2(CF_2)_6CH_2OCOCH=CH_2$ | 65 | 65 | 64 | — |
| $CH_2=CHCOO(CH_2)_2(CF_2)_6(CH_2)_2OCOCH=CH_2$ | — | — | — | 35 |
| $CH_2=CHCOO(CH_2)_2(CF_2)_5(CH_2)_2OCOCH=CH_2$ | — | — | — | 30 |
| $CH_2=CHCOO(CH_2)_2(CF_2)_4(CH_2)_2OCOCH=CH_2$ | — | — | — | 15 |
| $CH_2=CHCOO(CH_2)_2(CF_2)_3(CH_2)_2OCOCH=CH_2$ | — | — | — | 5 |
| $CH_2=CHCOOCH_2C(CH_3)_2CH_2OOCCH=CH_2$ | 15 | 15 | 14 | 0 |
| $CH_3CH_2C(CH_2OOCCH=CH_2)_3$ | 5 | 5 | 5 | 0 |
| (phenyl-cyclohexyl ketone with OH) | 5 | 5 | 5 | 5 |
| Additive $(CH_2=CH)_2Si(OCH_3)_2$ | 0 | 0 | 2 | 0 |

COMPARATIVE EXAMPLES 1 TO 4

Resin compositions having compositions indicated in following Table 2 were prepared by using the same polymers (I) to (IV) as in Examples 1 to 4.

By using each of these compositions, an optical fiber was prepared in the same manner as in Examples 1 to 4 and an optical fiber cord having the same structure as in Examples 1 to 4 was prepared under the substantially same conditions.

Table 3 shows properties when a crimp type optical connector was connected with the optical fiber and the optical fiber cord.

TABLE 2

|  | 1 | 2 | 3 | 4 |
|---|---|---|---|---|
| Polymer (I) | 10 | — | — | — |
| Polymer (II) | — | 10 | — | — |
| Polymer (III) | — | — | 10 | — |
| Polymer (IV) | — | — | — | 10 |
| $CH_2=CHCOOCH_2(CF_2)_7CF_3$ | 65 | 65 | 65 | — |
| $CH_2=CHCOO(CH_2)_2(CF_2)_7CF_3$ | — | — | — | 65 |
| $CH_2=CHCOO(CH_2)_2(CF_2)_5(CH_2)_2OCOCH=CH_2$ | — | — | — | 15 |
| $CH_2=CHCOO(CH_2)_2(CF_2)_4(CH_2)_2OCOCH=CH_2$ | — | — | — | 5 |
| $CH_2=CHCOOCH_2C(CH_3)_2CH_2OOCCH=CH_2$ | 15 | 15 | 15 | 0 |
| $CH_3CH_2C(CH_2OOCCH=CH_2)_3$ | 5 | 5 | 5 | 0 |
| (phenyl-cyclohexyl ketone with OH) | 5 | 5 | 5 | 5 |

TABLE 3

|  | Example No. | | | | Comp. Example No. | | | |
|---|---|---|---|---|---|---|---|---|
|  | 1 | 2 | 3 | 4 | 1 | 2 | 3 | 4 |
| Pull-out strength between connector and fiber (kg) *1 | | | | | | | | |
| at 25° C. | 2.4 | 2.1 | 2.5 | 3.1 | 1.4 | 1.7 | 1.6 | 1.8 |
| at 85° C. | 1.6 | 1.5 | 1.8 | 2.2 | 0.5 | 0.6 | 0.5 | 0.6 |
| Protrusion amount of core (μm) *2 | | | | | | | | |
| after 1000 hr. at 85° C. | 0−+6 | −1−+8 | −1−+2 | −1−+3 | −4−+31 | −25−+16 | −11−+20 | −15−+21 |
| after 1000 hr. at 85° C., 95% RH | −4−+6 | −3−+7 | −5−+4 | −4−+5 | −61−+85 | −10−+52 | −33−+15 | −20−+32 |
| after heat cycle | −6−+5 | −9−+2 | −2−+7 | −5−+4 | −29−+107 | −51−+68 | −47−+19 | −39−+56 |

TABLE 3-continued

| | Example No. | | | | Comp. Example No. | | | |
|---|---|---|---|---|---|---|---|---|
| | 1 | 2 | 3 | 4 | 1 | 2 | 3 | 4 |
| (85° C./−40° C. × 100 cycles) | | | | | | | | |

Note
*1: Pull-out strength between the crimp type connector and the optical fiber cladding
*2: The sample number of each test (n) = 10.
(+) value represents a maximum value of protrusion, and
(−) value represents a maximum value of retraction As explained above, the optical fiber having the cladding made of the photosetting composition according to the present invention has good mechanical properties and, particularly, low deterioration of properties at a high temperature. Namely, a decrease of retention strength between the crimp type connector and the optical fiber is lowered at a high temperature (at least 85° C.) and the core protrusion from the tip end of the connector is small after leaving the fiber at a high temperature or at a high temperature and a high humidity or after subjecting the fiber to a heat cycle. Accordingly, the optical fiber according to the present invention is useful as an optical fiber for a short or intermediate distance optical communication system which, for example, is used at a high temperature and a high humidity with connected with a crimp type connector.

What is claimed is:

1. A plastic clad optical fiber comprising a core made of quartz glass or optical glass and a cladding made of a plastic material having a refractive index smaller than that of the core, wherein the cladding is made of a cured material of a photosetting resin composition characterized by the absence of a compound having only one unsaturated bond in a molecule and comprising at least one compound which has at least two unsaturated bonds in a molecule and a photopolymerization initiator.

2. The plastic clad optical fiber according to claim 1, wherein the compound having at least two unsaturated bonds in a molecule which is contained in the photosetting resin composition is a copolymer which comprises a repeating unit of the formula:

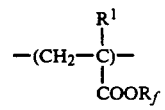

wherein
$R^1$ is a hydrogen atom or a methyl group, and
$R_f$ is a fluoroalkyl group,
and a repeating unit having an unsaturated bond.

3. The plastic clad optical fiber according to claim 1, wherein the compound having at least two unsaturated bonds in a molecule which is contained in the photosetting resin composition is a compound of the formula:

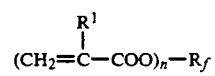

wherein
$R^1$ is a hydrogen atom or a methyl group,
$R_f$ a fluoroalkyl group, and
n is a number of at least two.

4. The plastic clad optical fiber according to claim 1, wherein the compound having at least two unsaturated bonds in a molecule which is contained in the photosetting resin composition has at least one urethane linkage in a molecule.

* * * * *